United States Patent
Ren et al.

(10) Patent No.: US 12,024,581 B2
(45) Date of Patent: Jul. 2, 2024

(54) POLYOL COMPOSITION

(71) Applicant: Dow Global Technologies LLC, Midland, MI (US)

(72) Inventors: Hua Ren, Shanghai (CN); Beilei Wang, Shanghai (CN); Huan Chen, Beijing (CN); Yongchun Chen, Shanghai (CN); Dong Yun, Shanghai (CN); Cheng Shen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 627 days.

(21) Appl. No.: 17/279,416

(22) PCT Filed: Sep. 28, 2018

(86) PCT No.: PCT/CN2018/108366
§ 371 (c)(1),
(2) Date: Mar. 24, 2021

(87) PCT Pub. No.: WO2020/062036
PCT Pub. Date: Apr. 2, 2020

(65) Prior Publication Data
US 2022/0010051 A1   Jan. 13, 2022

(51) Int. Cl.
*C08G 18/32* (2006.01)
*C08G 18/12* (2006.01)
*C08G 18/48* (2006.01)
*C08L 75/08* (2006.01)

(52) U.S. Cl.
CPC ......... *C08G 18/3206* (2013.01); *C08G 18/12* (2013.01); *C08G 18/4816* (2013.01); *C08G 18/4825* (2013.01); *C08G 18/4829* (2013.01); *C08G 18/485* (2013.01); *C08G 18/4854* (2013.01); *C08G 18/4883* (2013.01); *C08L 75/08* (2013.01)

(58) Field of Classification Search
CPC ............... C08G 18/3206; C08G 18/12; C08G 18/4816; C08G 18/4883; C08G 18/4829; C08G 18/485; C08G 18/4854; C08G 18/4825; C08L 75/08

USPC ........................................................ 524/590
See application file for complete search history.

(56) References Cited

U.S. PATENT DOCUMENTS

| 2012/0232180 | A1 | 9/2012 | Kunst et al. | |
| 2018/0057721 | A1* | 3/2018 | Krishnan | C08G 18/4854 |
| 2020/0317850 | A1* | 10/2020 | Shah | C08G 18/246 |

FOREIGN PATENT DOCUMENTS

| DE | 10145440 | | 4/2003 |
| DE | 10145458 | | 4/2003 |
| EP | 1217019 | | 6/2002 |
| JP | 4826865 | B2 | 11/2011 |
| JP | 2014009310 | A | 1/2014 |
| JP | 5938283 | B2 * | 6/2016 |
| JP | 5938283 | B2 | 6/2016 |
| WO | 2007095730 | | 8/2007 |
| WO | 2009129292 | | 10/2009 |
| WO | 2014160617 | | 10/2014 |
| WO | 2017210001 | A1 | 12/2017 |
| WO | 2017219344 | A1 | 12/2017 |

OTHER PUBLICATIONS

Translation of JP 5938283 (patent application 2012-147610), Jun. 22, 2016. (Year: 2016).*
Search Report from corresponding European application EP 18 93 5339 dated Mar. 9, 2022.
PCT/CN2018/108366, International Search Report and Written Opinion with a mailing date of Jun. 27, 2019.
1 Office Action from corresponding Chinese application 201880098887.9 dated Jul. 27, 2022.

* cited by examiner

Primary Examiner — Hui H Chin
(74) Attorney, Agent, or Firm — Arthur R. Rogers

(57) ABSTRACT

A polyurethane composition reaction mixture including: (a) at least one organic isocyanate; and (b) at least one butylene oxide-based hydrophobic polyol; a process for making the above polyurethane composition; a polyurethane composite article composition, a process for making the above polyurethane composite article composition; and a process for making a composite article from the above polyurethane composite article composition.

8 Claims, 3 Drawing Sheets

POLYOL COMPOSITION

FIELD

The present invention relates to a polyol composition useful for preparing a polyurethane composition, a polyurethane composition useful for preparing a polyurethane composite article, and a polyurethane composite article made therefrom.

BACKGROUND

Well known in the art is producing polyurethane-based composite articles from a reactive polyurethane composition containing a polyol component and a polyisocyanate component. To prepare a polyurethane-based composite article, it is a common problem to correctly determine the right balance of the reactivity, the mechanical performance, the pot life (or workable time) and the water absorption (moisture scavenge) properties of the known reactive polyurethane composition formulation used to produce the polyurethane-based composite article. To improve the mechanical performance, a polyol having a high hydroxyl (OH) value and multiple functionalities is usually introduced into the formulation. Such polyols have a high OH value and multiple functionalities; and normally are prepared from ethylene oxide (EO) or propylene oxide (PO). However, the use of EO or PO polyols will result in a polyurethane formulation having a high moisture absorption property and a high foaming problem. In addition, the EO and PO polyols component of the reactive polyurethane composition usually exhibit a high reactivity with the polyisocyanate component of the reactive polyurethane composition; and thus, when the known polyol is mixed with the known polyisocyanate to form a reactive polyurethane formulation, the workable time (usually measured by flow time or gel time in units of minutes [min]) of the polyurethane formulation is significantly reduced.

To meet the mechanical strength requirements, a high crosslinking density polyol is typically used in a polyurethane formulation; and thus, a multi-functionality, short molecular chain polyol, such as VORANOL CP260, CP450, RH360 and the like (available from The Dow Chemical Company), is typically introduced into a polyurethane formulation. To minimize the foaming issue of the polyurethane formulation, a hydrophobic polyol, for example, castor oil or another very hydrophobic polyol is usually added into the formulation. In other instances, castor oil derivatives, such as SOVERMOL series products, are used in the formulation. The long aliphatic alkyl chain of a hydrophobic polyol provides the desired hydrophobicity to prevent, or decrease, the foaming issue of the polyurethane formulation. However, in a practical application, it has been found that castor oil itself has a relative high reactivity with isocyanates such as diphenylmethane-diisocyanate (MDI)/polymeric MDI isocyanate and SPECFLEX NS540 isocyanate (a polymeric MDI with 2.3 functionality, available from The Dow Chemical Company) which are typically used in a polyurethane formulation.

Another problem with the polyol composition component of a polyurethane formulation relates to the compatibility limitation between the components in the polyol composition. For example, castor oil and other petrol-based polyols, such as VORANOL CP260, SIMULSOL TOFP (PO polyols) and the like, present in the polyol composition are usually not very compatible with each other. When a high dosage of a petrol-based polyol is incorporated into a polyurethane formulation containing castor oil, instability of the formulation can occur. However, in some cases, a high dosage of a petrol-based polyol is required in a polyurethane formulation to achieve a formulation that provides adequate mechanical performance.

A polyol composition containing polyol components such as (1) a vegetable oil-based polyol (e.g., castor oil) and (2) a petrol-based polyol (e.g., butylene oxide [BO]) that exhibit an improved compatibility between each other would be highly desirable in the industry of manufacturing polyurethanes. In addition, reducing the reactivity of (1) the polyol components with (2) an isocyanate of a polyurethane formulation containing such polyols; and improving the mechanical performance of a polyurethane formulation containing such polyols; may, in turn, provide significant advantages in developing polyurethane formulations for manufacturing composite articles from the polyurethane formulations by improving, for example, the processability of the polyurethane formulations.

Heretofore, polyurethane articles such as flexible, semi-rigid and rigid polyurethane foams have been produced by known processes of reacting a polyisocyanate with a polyol mixture containing BO and other additives. Such known processes are disclosed in, for example, US 20120232180 A1, DE10145458, DE10145440, and EP1217019. However, none of the above references describe the use of a polyol component including one polyol compound or a mixture of two or more polyol compounds for a reactive polyurethane formulation which exhibits reduced reactivity and/or reduced water absorption.

SUMMARY

The polyol composition of the present invention provides a solution to problems encountered with the use of prior art polyurethane compositions. For example, the polyol composition of the present invention, which includes a mixture of two or more polyol compounds (e.g., a vegetable oil-based polyol such as castor oil; and e.g., a petrol-based polyol such as BO), provides: (1) an increase in compatibility between the two or more polyol compounds present in the polyol composition; (2) a reduction of reactivity between the polyols and polyisocyanates present in a polyurethane formulation; and (3) a reduction of water absorption property of the polyurethane formulation.

Using the polyol composition of the present invention in a polyurethane composition, results in a polyurethane composition with several enhanced (optimum) properties including compatibility, extension of workable time, and mechanical performance properties. In addition, the processability and method of making the polyol composition, the polyurethane composition, and polyurethane composite articles made from the polyurethane composition are significantly enhanced.

In one embodiment, the present invention is directed to a polyol formulation or composition including (a) at least one petrol-based polyol such as a butylene oxide (BO)-based hydrophobic polyol; and (b) at least one vegetable oil-based polyol such as castor oil; wherein the compatibility is increased between the petrol-based polyol and the vegetable oil-based polyol present in the polyol composition.

In another embodiment, the present invention is directed to a polyurethane composition including (i) as a first component, the above polyol composition; and (ii) as a second component, a polyisocyanate. Advantageously, adding the polyol composition containing a BO-based polyol to a polyurethane formulation: (1) increases or expands the workable time of the polyurethane formulation (i.e., the reactivity of first and second components of the polyurethane formulation is extended) and (2) enhances the mechanical performance of the polyurethane formulation.

In still another embodiment, the present invention is directed to a polyurethane composite article composition including: (A) as a first component, the above polyurethane composition; and (B) as a second component, a structural material such as a fiber.

In yet another embodiment, the present invention is directed to a polyurethane composite article made from the above a polyurethane composite article composition.

In even still other embodiments, the present invention includes processes for producing (1) the above polyol composition, (2) the above polyurethane composition, (3) the above polyurethane composite article composition, and (4) a composite article made from the above polyurethane composite article composition.

DETAILED DESCRIPTION

Figure 1:
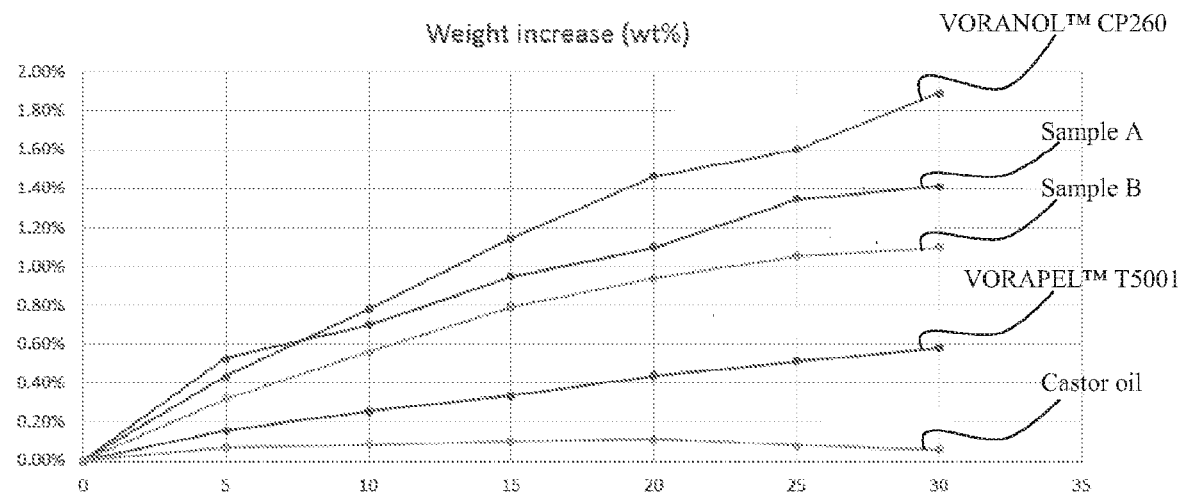
FIG. 1 is a graphical illustration showing water absorption results for various compositions.

Generally, a polyurethane composite article can be made from a polyurethane composite composition which includes: (A) as a first component, a polyurethane composition; and (B) as a second component, at least one structural material such as a fiber material. Component (A), the polyurethane composition, of the polyurethane composite composition can be made from a mixture including (i) a polyol composition as a first component; and (ii) at least one polyisocyanate as a second component. Component (i), the polyol composition, of the polyurethane composition can be made from a mixture including: (a) at least one petrol-based polyol such as a butylene oxide (BO)-based hydrophobic polyol; and (b) at least one vegetable oil-based polyol such as castor oil.

In one embodiment, the polyol formulation or composition of the present invention can include: (a) at least one petrol-based polyol such as a butylene oxide (BO)-based hydrophobic polyol; and (b) at least one vegetable oil-based polyol such as castor oil; wherein the compatibility is increased between the petrol-based polyol and the vegetable oil-based polyol present in the polyol composition.

The first component (a) of the polyol composition of the present invention includes at least one petrol-based polyol. In a preferred embodiment, the petrol-based polyol may include one or more butylene oxide (BO)-based polyols. For example, in one embodiment, the BO-based polyol, can include a pure BO-based polyol, such as VORAPEL™ T5001 (available from The Dow Chemical Company). In another embodiment, the BO-based polyol can be at least one BO-based hydrophobic polyol. Exemplary of BO-based hydrophobic polyols useful in the present invention can include one or more of the hydrophobic polyols having the following general chemical Structure (I):

$$R\text{-}[(EPO)_n\text{-}(AO)_m]_x \qquad \text{Structure (I)}$$

The above Structure (I) includes hydrotropic polyols useful in the present invention, where R is an initiator; EPO is ethylene oxide or propylene oxide; n may be a number in the range of from 0 to ~10; AO is an alkylene oxide, including but not limited to, for example, butylene oxide; m may be a number in the range of from 1 to ~10; and x is the functionality of the polyol and x may be ≥3.

Exemplary of hydrotropic polyols represented by Structure (I) may include BO-capped polyols such as "pentaerythritol" (also referred to herein as "Sample A"); "sorbitol" (also referred to herein as "Sample B"); and "glycerin" (e.g., VORAPEL™ T5001). The following Table I provides a summary of some of the properties of the two compounds Sample A and Sample B.

TABLE I

BO Capped Polyols

| Structure | 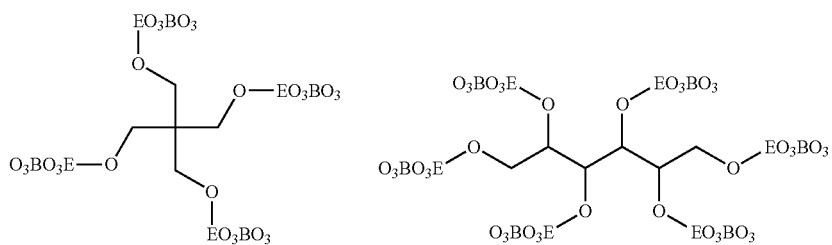 | |
|---|---|---|
| Sample | A | B |
| Name | Pentaerythritol initiated Sample A | Sorbitol initiated Sample B |
| Hydroxyl (OH) number (mg KOH/g) | 148.32 | 144.29 |
| Water content (%) | 0.08 | 0.07 |

TABLE I-continued

BO Capped Polyols

| Structure | (pentaerythritol-based structure with EO₃BO₃ groups) | (sorbitol-based structure with EO₃BO₃ groups) |
|---|---|---|
| Acid value (mg/g) | 0.07 | 0.07 |
| Potassium (ppm) | 4.3 | 6.4 |
| pH | 8.3 | 8.3 |
| MW (from structure calculation) | 1,530 | 2,273 |

In an alternative embodiment, the butylene oxide-based polyol used in the present invention can be made prior to mixing the BO-based polyol with the vegetable-based polyol. For example, the BO-based polyol can be produced by reacting (i) an initiator, such as glycerin, pentaerythritol, sorbitol, and the like; and (ii) butylene oxide (BO) at various mole ratios. In one broad embodiment, the initiator can firstly be reacted with a different separate polyol compound such as ethylene oxide or propylene oxide to form a reaction product, and then the reaction product can be reacted with butylene oxide to produce the butylene oxide containing polyol useful in the present invention. Any conventional reaction process and equipment can be employed for such carrying out the above reactions to produce the butylene oxide containing polyols of the present invention.

Generally, the BO-based polyol, first component (a) of the polyol composition, can be present in the polyol composition at a concentration in the range of from 5 wt % to 50 wt % in one embodiment; from 10 wt % to 30 wt % in another embodiment; and from 10 wt % to 25 wt % in still another embodiment.

The second component (b) of the polyol composition of the present invention includes at least one vegetable oil-based polyol. Exemplary of the vegetable oil-based polyol useful in the present invention can include one or more of the following: castor oil, soybean oil derivative polyol, linseed oil derivative polyol, and mixtures thereof.

Generally, the vegetable oil-based polyol, second component (b) of the polyol composition, can be present in the polyol composition at a concentration in the range of from 10 wt % to 50 wt % in one embodiment; from 20 wt % to 50 wt % in another embodiment; and from 25 wt % to 45 wt % in still another embodiment.

The optional components (c) of the polyol composition of the present invention may include any one or more of the following compounds: petrol base EO/PO polyols, defoamers, wetting agents/dispersants, molecular sieves, adhesion promoter, and mixtures thereof.

In one broad embodiment, a process for making the polyol composition of the present invention may include the step of admixing: (a) at least one butylene oxide-based hydrophobic polyol; and (b) at least one vegetable oil-based polyol.

Using the polyol composition containing butylene oxide polyols of the present invention advantageously increases the compatibility performance between ethylene oxide containing polyols, propylene containing polyols and hydrophobic vegetable oil-based polyols. Generally, the compatibility performance of the polyol composition, as measured by phase diagram, can be in the range of from 1 wt % to 55 wt % EO/PO petrol polyol into castor oil in one embodiment; from 20 wt % to 55 wt % of EO/PO petrol polyol into castor oil in another embodiment; and from 35 wt % to 55 wt % EO/PO petrol polyol into castor oil in still another embodiment.

The polyol composition of the present invention can also exhibit the benefit of having a lower water absorption property when compared to the water absorption performance of ethylene oxide/propylene oxide containing polyols. Generally, the reduction in water absorption performance of the polyol composition can be determined by measuring the weight increase of the composition over a period of time. Water absorption of the present invention composition can be, for example, in the range of from 0.1 wt % to 1.2 wt % of weight increase in one embodiment; from 0.2 wt % to 1.2 wt % in another embodiment; and from 0.3 wt % to 1.2 wt % in still another embodiment, measured at a temperature of 22 degrees centigrade (° C.) and a humidity of 53 percent (%).

In another embodiment, the polyurethane composition of the present invention includes (i) the above-described polyol composition as a first component; and (ii) a polyisocyanate as a second component.

In general, a polyurethane composition can be described as including an "A-side material" and a "B-side material", wherein the A-side material includes at least one isocyanate-containing material (herein above is component [ii]); and wherein the B-side material includes at least one polyol-containing material which can be a blend of two or more polyols (herein above is component [i]). Other additives can be added to the polyurethane composition such as at least one cross-linker, and at least one surfactant. The resulting polyurethane composition without a structural material is a reactive composition that provides a reaction product by reacting the A-side material with the B-side material to form a polyurethane composite article. In one broad embodiment, the present invention includes the above component (i), a novel polyol-containing material (B-side) to form the reactive polyurethane composite composition or system. The polyol-containing material of the present invention has been found to provide unexpected enhance properties to the reactive polyurethane composite composition prepared using the polyol-containing material of the present invention.

The first component of the polyurethane composition of the present invention, component (i), includes the polyol composition which has been described in detail above. The polyol composition, for example, uses the polyol composition containing the hydrophobic BO-polyol component in the B-side material. As aforementioned, in a preferred embodiment, the polyol composition useful for making a polyurethane composition includes at least one butylene oxide-based hydrophobic polyol; wherein the at least one butylene oxide-based hydrophobic polyol provides the polyurethane composition with a reduced reactivity property, a reduced water absorption property, and an increased compatibility property.

Advantageously, adding the polyol composition containing a BO-based polyol to a polyurethane formulation: (1) increases or expands the workable time of the polyurethane formulation (i.e., the reaction time of first and second components of the polyurethane formulation is extended) and (2) enhances the mechanical performance of the polyurethane formulation.

The second component of the polyurethane composition of the present invention, component (ii), includes at least one polyisocyanate compound. For example, suitable isocyanates, component (ii), for use in preparing the polyurethane composition may include any of the organic isocyanates known in the art for preparing polyurethanes, like aliphatic, cycloaliphatic, araliphatic and aromatic isocyanates. In one embodiment, aromatic polyisocyanates are generally preferred based on cost, availability and properties imparted to the product polyurethane. Exemplary polyisocyanates useful in the present invention include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4''-triphenylmethane triisocyanate, polymethylene polyphenylisocyanates or mixtures thereof with MDI (polymeric MDI), hydrogenated polymethylene polyphenylisocyanates, toluene-2,4,6-triisocyanate, and 4,4'-dimethyl diphenylmethane-2,2',5,5'-tetraisocyanate. In one preferred embodiment, the polyisocyanates that can be used in forming the polyurethane composition of the present invention may include MDI and derivatives of MDI such as biuret-modified "liquid" MDI products and polymeric MDI, as well as mixtures of the 2,4- and 2,6-isomers of TDI.

Another preferred embodiment, the polyisocyanate is a polymeric MDI such as VORANATE™ M229; or a mixture of TDI isomers with MDI wherein the TDI isomers constitutes from 60 percent by weight (wt %) to 90 wt % of the mixture, and in which the 2,4-TDI isomer constitutes at least 70 wt % of the TDI isomers such as VORANATE™ TM-20. The above VORANATE™ products are available from The Dow Chemical Company.

In one embodiment, the polyisocyanate or mixture thereof, in general, can have an average of 1.8 or more isocyanate groups per molecule. In another embodiment, the isocyanate functionality may be from about 1.9 to 4, from 1.9 to 3.5 in still another embodiment, and from 1.9 to 2.7 in yet another embodiment.

In another preferred embodiment, the polyisocyanate useful in the present invention may be 2,4-toluene diisocyanate, 2,6-toluene diisocyanate, a mixtures of 2,4-toluene diisocyanate and 2,6-toluene diisocyanate; 2,4'-diphenylmethane diisocyanate, 2,2'-diphenylmethane diisocyanate, 4,4'-diphenylmethane diisocyanate, a mixture of 2,4'-diphenylmethane diisocyanate, 2,2'-diphenylmethane diisocyanate, 4,4'-diphenylmethane diisocyanate; or mixtures thereof.

In still another embodiment, other suitable isocyanates, component (ii), for use in preparing the polyurethane composition may include any of the isocyanate compounds commercially available such as SPECFLEX NS 540 and PAPI 27 Polymeric MDI.

The amount of polyisocyanate that may be used in forming the polyurethane composition generally can be an amount that is sufficient to provide an isocyanate index of from 70 to 125 in one embodiment. In another embodiment, the isocyanate index range may be from 80 to 115 and in still another embodiment, the isocyanate index range may be from 90 to 105. "Isocyanate index" herein means a value that is 100 times the ratio of isocyanate groups to isocyanate-reactive groups in a formulation.

In preparing the polyurethane composition, other additional optional compounds or additives may be added to either the A-side material and/or the B-side material as desired. One or more additional types of other materials, as may be useful in the manufacturing process used to make the composition or to impart desired characteristics to the resulting composite article, may be used including for example, catalysts, surfactants, crosslinkers, chain extenders, fillers, colorants, fire retardants, pigments, antistatic agents, reinforcing fibers, antioxidants, preservatives, acid scavengers, and a mixture thereof.

In one preferred embodiment, the polyurethane composition of the present invention may further include one or more of the following compounds: (iv) at least one crosslinker; (v) at least one surfactant; and mixtures thereof.

Generally, the optional component in the composition, if used, can be in the range of from 0 wt % to 20 wt % in one embodiment; from 1 wt % to 15 wt % in another embodiment; and from 2 wt % to 10 wt % in still another embodiment.

As one illustration, and not to be limited thereby, the present invention composition can include one or more of the following components and in the following concentrations: VORAPEL™ T5001 polyol from 1 wt % to ~50 wt % in one embodiment and from 2 wt % to ~30 wt % in another embodiment; BO-capped polyol (also referred to herein as "Sample A") from 1 wt % to ~50 wt % in one embodiment and from 2 wt % to ~30 wt % in another embodiment; BO-capped polyol (also referred to herein as "Sample B") from 1 wt % to ~50 wt % in one embodiment and from 2 wt % to ~30 wt % in another embodiment; VORANOL™ CP260 from 10 wt % to ~50 wt % in one embodiment and from 5 wt % to ~30 wt % in another embodiment; castor oil from 1 wt % to ~50 wt % in one embodiment and from 5 wt % to ~50 wt % in another embodiment; SIMULSOL TOFP propylene oxide (PO) polyols from 1 wt % to ~20 wt % in one embodiment and from 5 wt % to ~20 wt % in another embodiment; dipropylene glycol from 0 wt % to ~5 wt % in one embodiment and from 1 wt % to ~5 wt % in another embodiment; SPECFLEX™ NS540 isocyanate (a polymeric MDI with 2.3 functionality) from 1 wt % to ~60 wt % in one embodiment and from 30 wt % to ~50 wt % in another embodiment; a molecular sieve from 0 wt % to ~20 wt % in one embodiment and from 0 wt % to ~10 wt % in another embodiment; a wetting agent from 0 wt % to ~10 wt % in one embodiment and from 0 wt % to ~5 wt % in another embodiment; a defoamer from 0 wt % to ~1 wt % in one embodiment and from 0 wt % to ~0.5 wt % in another embodiment; an organic solvent from 0 wt % to ~10 wt % in one embodiment and from 0 wt % to ~5 wt % in another embodiment; and Techpur Black from 0 wt % to ~1 wt % in one embodiment and from 0 wt % to ~0.5 wt % in another embodiment. The ranges of the above components are per 100 parts (g) of formulation.

In one broad embodiment, a process for making a polyurethane composition of the present invention may include the step of admixing: (i) the butylene oxide-based hydrophobic polyol; and (ii) the polyisocyanate.

The polyurethane composition can be used to form a polyurethane composite article composition with a conventional process and equipment as known in the art. For example, the polyurethane composition of the present invention described above can be used as a matrix material for a fiber-containing composite such as in a filament winding process, in a pultrusion process, or in another similar conventional process well-known in industry.

The polyurethane composite article composition useful for producing a polyurethane composite article include, for example, (A) the above-described polyurethane composition as a first component; and (B) at least one structural material, such as a fiber material, as a second component.

The first component of the polyurethane composite article composition of the present invention, component (A), includes the polyurethane composition which has been described in detail above. Component (A), the polyurethane composition, for example, uses (i) the above-described polyol composition as a first component; and (ii) a polyisocyanate as a second component.

The structural material useful as component (B) in the present invention may include for example a substrate such as metal and the like, and mixtures thereof; a fiber material such as glass fiber, carbon fiber, and the like, and mixtures thereof; a particulate such as filler, glass beads, and the like, and mixtures thereof.

In one embodiment, the structural material such as a fiber material can be selected for example from glass fiber or carbon fiber, and the like; and mixtures thereof. Generally, the fiber material in the polyurethane composite article composition, can be in the range of from 20 wt % to 80 wt % in one embodiment; from 40 wt % to 80 wt % in another embodiment; and from 50 wt % to 70 wt % in still another embodiment, based on the total weight of the components in the polyurethane composite article composition.

The optional additives, component (C) of the polyurethane composite article composition can be selected for example from defoamers, wetting agents, carbon black, molecular sieve, adhesion promoter, and the like; and mixtures thereof.

Generally, the additive component (C) in the polyurethane composite article composition can be in the range of from 0.5 wt % to 15 wt % in one embodiment; from 1 wt % to 15 wt % in another embodiment; and from 5 wt % to 15 wt % in still another embodiment, based on the total weight of the components in the composition.

In one broad embodiment, a process for making a polyurethane composite article composition of the present invention may include the step of admixing: (A), the polyurethane composition which has been described in detail above; and the structural material, component (B) described above.

As aforementioned, the polyol composition improves the processability of the polyurethane composition, which in turn, improves the processability of the polyurethane composite article composition, while no harm (or deleterious effect) in the performance of the polyurethane composition or the polyurethane composite article composition is observed. And, in some cases, the performance of the polyurethane composition or the polyurethane composite article composition can even be slightly or significantly improved. It will be evident to those skilled in the art that when the polyurethane composition and the polyurethane composite article composition performance is maintained or even improved, the final polyurethane composite article performance will also be maintained or even improved. It will also become evident to those skilled in the art, that the performance of the final polyurethane composite article can be dependent on the kind of structural material (e.g., fiber) used in combination with the polyurethane composite composition.

As described above, the polyol composition of the present invention containing butylene oxide polyols is a composition that has an increased compatibility performance, wherein the components in the polyol composition are compatible with each other, such as for example, among the butylene oxide containing polyols, the ethylene oxide containing polyols, propylene containing polyols and hydrophobic vegetable oil-based polyols. The compatible polyol composition can be used to make the polyurethane composition, which in turn, is used to make the polyurethane composite article. Because the polyol composition exhibits an increased compatibility performance between the different polyols in the polyol composition; and the polyurethane composition is made from of the polyol composition, some of the enhanced compatibility performance of the polyol composition can be imparted to the polyurethane composition. As a result, the polyurethane composition remains stable. In other words, the compatibility of the polyol composition with polyisocyanate component that makes up the polyurethane composition can be indirectly reflected by the mechanical strength of the final article made from the polyurethane composition. For example, if the mechanical strength of the polyurethane composite article is not reduced or even improved as in the present invention, there is no compatibility issue with the polyurethane composition or the polyurethane composite article made from the polyurethane composition.

With regard to the reduction in water absorption performance of the polyol composition compared to the polyurethane composition and the polyurethane composite article, the water absorption of the composite article can be indirectly reflected by bubbling performance of the polyurethane composition. For example, if no visible bubbles occur during the reaction of the polyurethane composition, this means that a good water resistant (i.e., a low water absorption) performance is indicated. The water absorption is mainly from the polyol component of the polyurethane composition, as described above. Generally, the isocyanate component of the polyurethane composition cannot absorb any water, otherwise, the isocyanate component can react with water first, and then the isocyanate component of the polyurethane composition fails before application of the polyurethane composition.

In one broad embodiment, the process for producing a polyurethane composite article made from the above polyurethane composite article composition may include the steps of:

(I) providing a polyurethane composite article composition;
(II) contacting the polyurethane composite article composition of step (I) with a structural material such that the structural material is substantially coated with the polyurethane composite article composition; and
(III) heating the structural material is substantially coated with the polyurethane composite article composition of step (II).

In another embodiment, the polyurethane composite article composition can be used to form a polyurethane composite article using a conventional composite-producing process and equipment such as a fiber winding process or a pultrusion process.

In another broad embodiment, a process for producing a polyurethane composite article of the present invention may include the steps of: (I) admixing: (a) at least one polyisocyanate; and (b) at least one butylene oxide-based hydrophobic polyol; and (c) ethylene oxide containing, propylene containing polyols and hydrophobic vegetable oil based polyols, where the admixing step (I) forms a reactive polyurethane composition; and (II) subjecting the resulting reactive polyurethane composition from step (I) to conditions sufficient to react the composition to form a polyurethane composite article exhibiting enhanced properties. The admixing step (I) can be carried out at, for example, room temperature (~25° C.) with traditional mechanical mixers and process conditions. And, the reaction step (II) can be carried out at a temperature of, for example, from 80° C. to 120° C.

As aforementioned, the polyurethane composite article composition of the present invention includes: (A) the above-described polyurethane composition as a first component; and (B) a structural material, such as a fiber, as a second component. The structural material-containing polyurethane composite article made from the polyurethane composition of the present invention can also exhibit improvements including for example an increase in the mechanical performance of the polyurethane composite article. For example, the tensile strength of the polyurethane composite article, as measured by ISO 527 Standard method, can be in the range of from 60 megapascals (MPa) to 90 MPa in one embodiment; from 65 MPa to 80 MPa in another embodiment; and from 70 MPa to 80 MPa in still another embodiment.

The polyurethane composition and the polyurethane composite article composition of the present invention can be used in many applications, including for example for producing composite utility poles made by, for example, a filament winding process, or for producing articles in the pultrusion industry involving polyurethane resin, and the like. In the above applications, polyurethane resins have drawn considerable interest as matrix materials because of the polyurethane resins' good mechanical performance (e.g. toughness and fatigue resistance) and chemical resistance performance as described above. However, a common contradictory in producing a polyurethane composition is the capability of balancing (1) the reactivity and the mechanical performance of the composition; and/or (2) the pot life (or workable life) and the water/moisture resistance of the composition sufficient to improve the overall mechanical performance of the composition.

A common conventional practice in the industry is to introduce polyols with a high hydroxyl value and multiple functionalities are usually introduced into a composition to improve mechanical performance. However, usual polyols used in the prior art are normally made from ethylene oxide (EO) or propylene oxide (PO) which will result in a composition having a high moisture absorption and foaming issues. In addition, the above prior art polyols usually have a high reactivity with isocyanate, and such known polyols will highly reduce the workable time of the polyurethane formulation. A short workable time is one of the common challenges for PU-base composites. The present invention, on the other hand, provides a polyurethane composition that exhibits a longer workable time while maintaining or increasing the mechanical performance of the composite article produced from the polyurethane composition.

EXAMPLES

The following examples are presented to further illustrate the present invention in detail but are not to be construed as limiting the scope of the claims. Unless otherwise indicated, all parts and percentages are by weight.

Various materials used for preparing the samples of the Inventive Examples (Inv. Ex.) and of the Comparative Examples (Comp. Ex.), which follow, are explained in Table II.

TABLE II

Raw Materials

| Component | Chemical Description | Supplier |
|---|---|---|
| VORAPEL ™ T5001 Polyol | Glycerine/BO polyol; OH n° = 280 KOH/g | The Dow Chemical Company |
| BO-Capped Polyol (Sample A) | Pentaerythritol/EO BO polyol; OH n° = 140 KOH/g~150 KOH/g | The Dow Chemical Company |
| BO-Capped Polyol (Sample B) | Sorbitol/EO BO polyol; OH n° = 140 KOH/g~150 KOH/g | The Dow Chemical Company |
| VORANOL ™ CP260 | Glycerine/PO polyol; OH n° = 660 KOH/g | The Dow Chemical Company |
| Castor oil | Castor oil | Natural Sourcing |
| SIMULSOL TOFP | Propylene oxide (PO) polyol: Trimethylolpropane/PO polyol; OH n° = 950 KOH/g | Shanghai Mofan Chemicals Co., Ltd. |
| Di propylene glycol (DPG) | Di propylene glycol | The Dow Chemical Company |
| SPECFLEX ™ NS540 | Isocyanate: polymeric MDI with 2.3 functionality | The Dow Chemical Company |
| Molecular sieve | Molecular sieve | Grace |
| TEP | Triethyl phosphate: organic solvent | Sinopharm Chemical Reagent Co., Ltd |
| BYK W980 | Wetting agent | BYK |
| BYK-A 530 | Defoamer | BYK |
| Techpur Black | Filler | Aike company |

Test Methods

General Procedure for Moisture Absorption Measurements

Step (1): Control the testing environment's humidity to a humidity of from 50% to ~60%.

Step (2): Weigh about 5 grams (g) of a polyol system or formulation and spread the polyol on a sheet of print paper with the size dimensions of the paper being 15 centimeters (cm)×10 cm.

Step (3): Observe and record the weight increase of the polyol as measured by a moisture indicator. Record the weight increase every 5 min. The recorded weight increase is considered the moisture absorption of the polyol.

Step (4): Plot the recorded weight increase of the polyol over time and from the results prepare a water absorption curve.

General Procedure for Reactivity with Isocyanate

A polyol formulation and an isocyanate formulation are prepared separately. The two formulations are mixed thoroughly; and then the viscosity building up of the mixture can be measured via an ARES-G2 Rheometer (available from TA Instruments) at a shear rate of 10/second. Data is collected every 10 seconds.

Alternatively, the viscosity building up of the mixture can be measured in an open vial using the HTR TADM viscosity measurement method and viscometer instrumentation as described in, for example, "A Novel High-Throughput Viscometer", ACS Comb. Sci. 2016, 18, 405-414. "HTR TADM" stands for High Throughput Research Total Aspirate and Dispense Method.

Another procedure useful in the present invention is referred to herein as the "Brookfield DV-II Pro large volume method" (i.e., a BROOKFIELD DV-II+ Pro is used to measure the viscosity building up of large volume samples). A spindle LV4 (ENTRY CODE: 64) is used at a speed of 50 revolutions per minute (rpm) for all the measurements. The measurement is stopped before the viscosity value exceeds 2 pascal-seconds (Pa-s) (2,000 centipoise [cps]) to protect the testing equipment. An electronic thermometer is placed into the sample to measure the temperature of the large volume samples.

General Procedure for Mechanical Performance (Tensile Strength) Testing

The formulation systems are casted in a mold and cut in a dumbbell shape for testing. The procedure described in ISO 527 Standard is followed to carry out tensile strength testing. The maximum tensile strength and the modulus properties are measured for every full composite formulation sample.

General Procedure for Compatibility Testing

Figure 4:
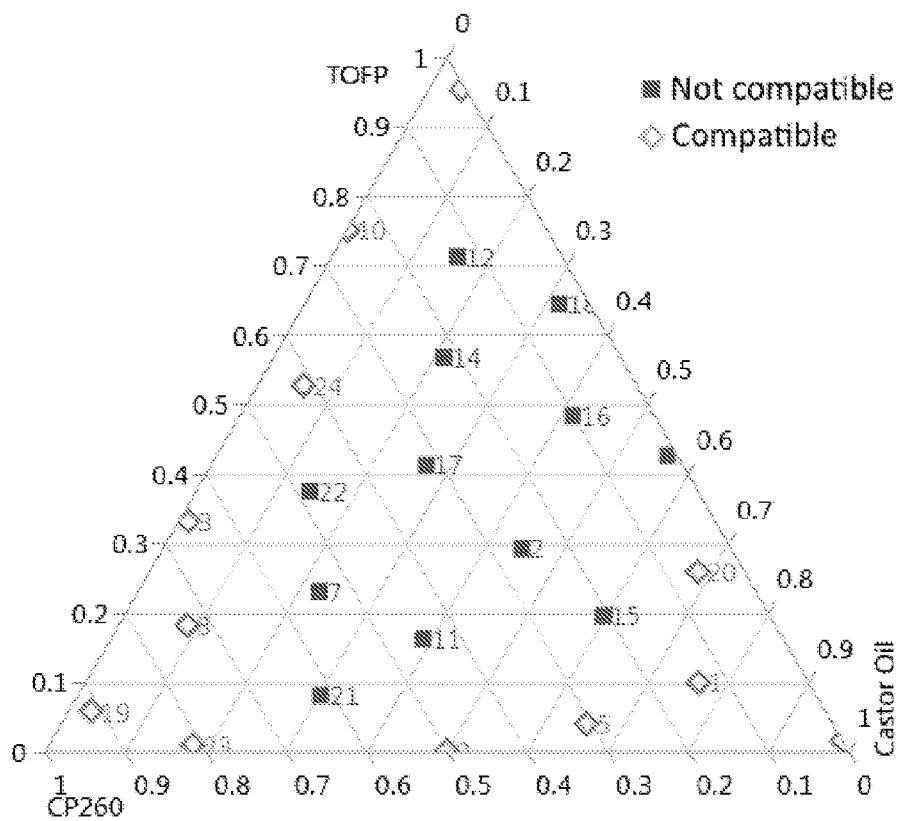
FIG. 4 a phase diagram of a ternary blend of VORANOL CP260, SIMULSOL TOFP and castor oil where the hollow diamonds define a compatible sample and the filled rectangles define an incompatible sample.
Figure 5:
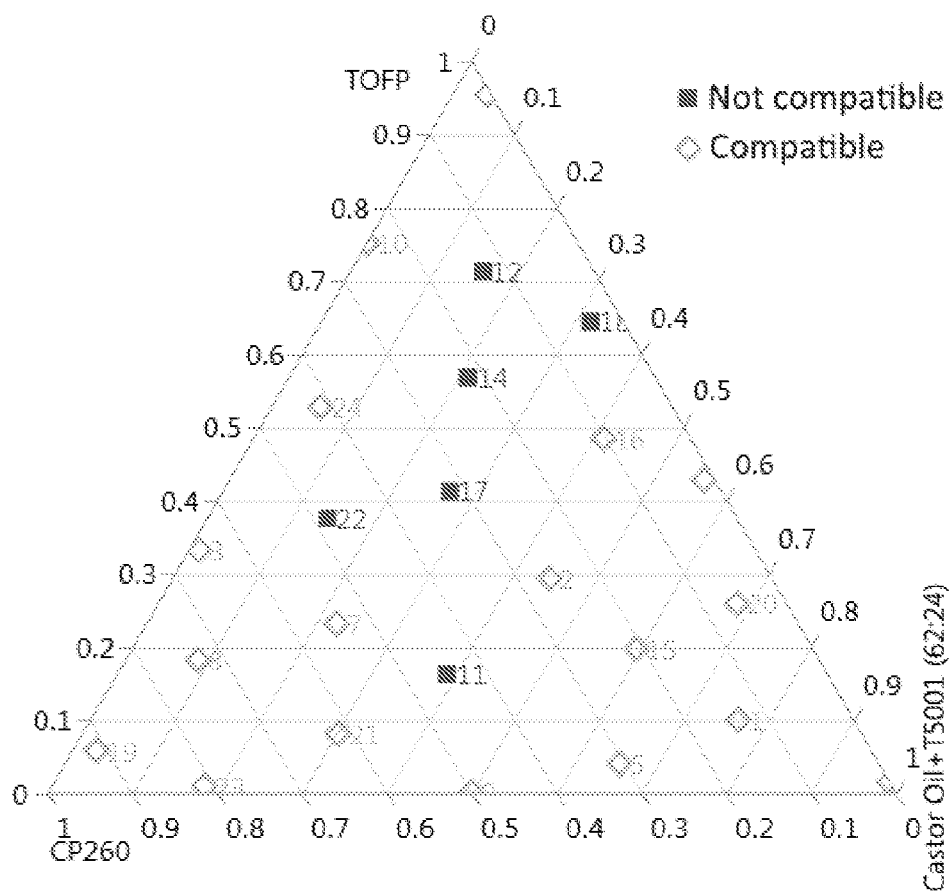
FIG. 5 another phase diagram of a ternary blend of (i) VORANOL CP260, SIMULSOL TOFP and castor oil; and (ii) VORAPEL T5001 at a ratio of (i):(ii) of 62:24 where the hollow diamonds define a compatible sample and the filled rectangles define an incompatible sample.

A Design of Experiment (mixture design) is conducted by blending ternary polyol blends (castor oil, VORANOL CP260 and SIMULSOL TOFP) at different ratios. Phase diagrams, such as the phase diagrams described in FIGS. 4 and 5, are obtained by inspecting the miscibility of the mixture and the compatibility of the mixture. Turbid or phase separated samples, as evaluated by visual inspection, are treated as incompatible (see, e.g., FIG. 6). Phase diagrams are compared before and after adding a BO-based polyol to a sample composition. It is determined that more compatible samples are obtained after adding a BO-based polyol to the sample compositions.

Figure 2:
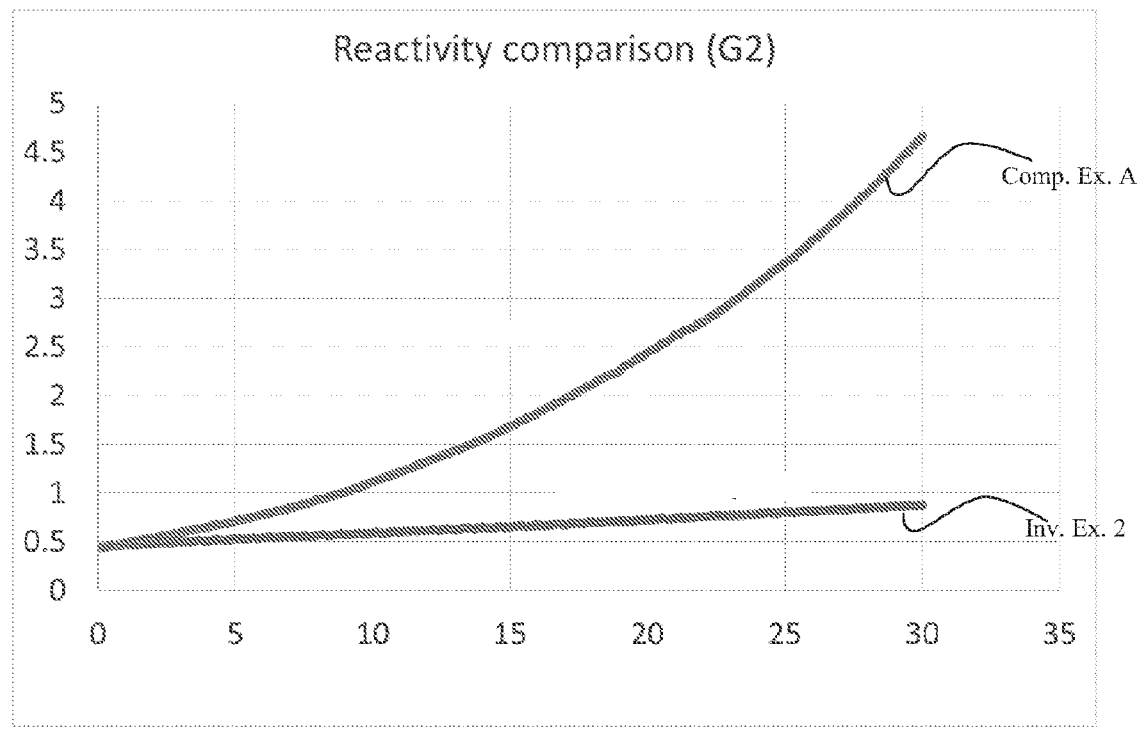
FIG. 2 is a graphical illustration showing a reactivity comparison between a BO-based polyol (Sample B) and castor oil using the ARES-G2 method.

In FIG. 2, a graph is shown of the weight increase (water absorption) of several samples of polyols plotted over a period of time. The results of weight increase (water absorption) of a conventional propylene oxide (PO)-based polyol, such as VORANOL CP260, is compared to the weight increase of a butylene oxide (BO)-capped polyol of the present invention (including for example a pure BO-based polyol such as VORAPEL™ T5001 polyol). The data in FIG. 2 shows that the water absorption is much lower for the BO-capped EO-BO-based polyol (Sample A) and the BO-capped EO-BO-based polyol (Sample B), than the water absorption of the conventional PO-based polyol, VORANOL CP260.

Figure 3:
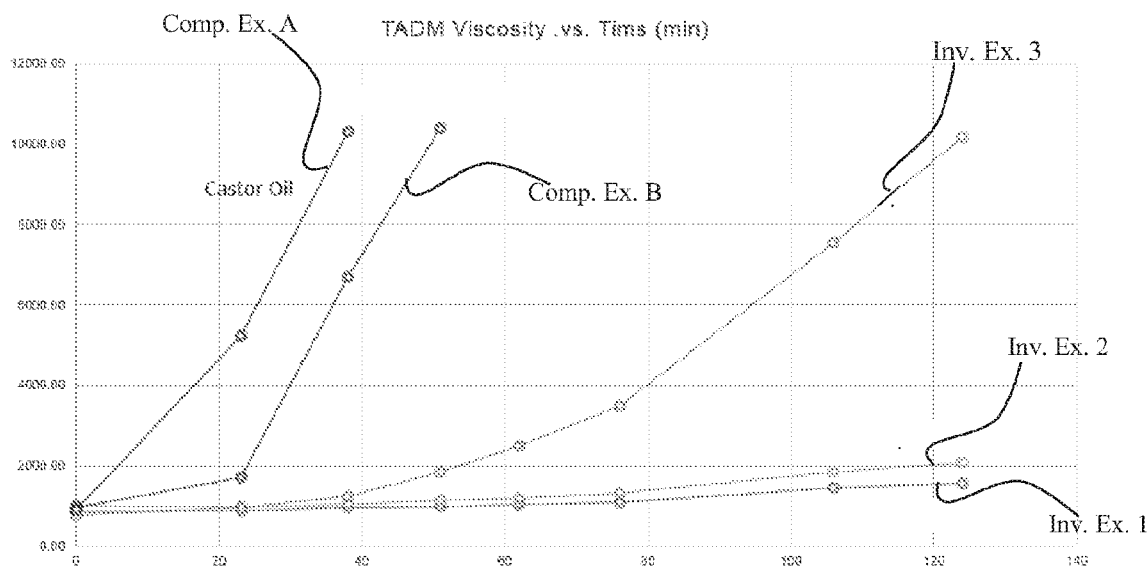
FIG. 3 is a graphical illustration showing a reactivity comparison between a BO-based polyol (Sample B) and castor oil using the HTR TADM method.

In FIG. 3, a graph is shown of a reactivity comparison between BO-based polyol Sample B and castor oil when the reactivity is measured using the ARES-G2 method. The data in FIG. 3 shows that the BO-based polyol has a much lower reactivity than castor oil at both an open and a closed environment.

The reactivity of several sample formulations described in Table IV is measured using the HTR TADM method; and the results are plotted as viscosity versus time in a graph shown in FIG. 4. As shown in FIG. 4, when sample formulations are exposed to environmental moisture, all the BO-based polyols have a much lower reactivity than that of castor oil and of a conventional PO-based polyol such as VORANOL CP260.

Inventive Examples 1-3 and Comparative Examples A and B

All the samples in the reactivity evaluation were prepared using the following general procedure: a polyol or polyol blend was firstly blended at a given dosage and then mixed using a FlackTek speed mixer for 2 min at 2,000 rpm. Then an isocyanate component was added into the polyol part and the resulting mixture of isocyanate and polyol was mixed again using a FlackTek speed mixer for another 2 min at 2,000 rpm. Then the viscosity of each sample was measured. The flow time is defined as the time when the viscosity reaches a viscosity higher than 2 Pa-s (2,000 cps).

TABLE IV

Formulations for Reactivity Comparison

| Example | Component | Weight (grams) |
|---|---|---|
| Inv. Ex. 1 | Sample A | 100 |
| | Polymeric isocyanate SPECFLEX NS540 | 35 |
| Inv. Ex. 2 | Sample B | 100 |
| | Polymeric isocyanate SPECFLEX NS540 | 35 |
| Inv. Ex. 3 | VORAPEL ™ T5001 Polyol | 100 |
| | Polymeric isocyanate SPECFLEX NS540 | 66 |
| Comp. Ex. A | Castor oil | 100 |
| | Polymeric isocyanate SPECFLEX NS540 | 42 |
| Comp. Ex. B | VORANOL CP260 | 100 |
| | Polymeric isocyanate SPECFLEX NS540 | 151 |

TABLE V

Effect of BO-Based Polyol on Reactivity of PU Composite Formulation

| | Comp. Ex. C F287* | Inv. Ex. 4 | Inv. Ex. 5 | Inv. Ex. 6 | Inv. Ex. 7 | Comp. Ex. D | Inv. Ex. 8 |
|---|---|---|---|---|---|---|---|
| Component | | | | | | | |
| VORANOL CP260 (wt %) | 25 | 25 | 25 | 25 | 25 | 25 | 25 |
| SIMULSOL TOFP (wt %) | 11 | 11 | 11 | 14 | 14 | 17 | 17 |
| VORAPEL T5001 (wt %) | 0 | 12 | 0 | 12 | 0 | 12 | 0 |
| Sample B (wt %) | 0 | 0 | 12 | 0 | 12 | 0 | 12 |
| Castor oil (wt %) | 49 | 37 | 37 | 34 | 34 | 31 | 31 |
| SPECFLEX NS540(wt %) | 91 | 94 | 90 | 100 | 96 | 106 | 102 |
| Test Results | | | | | | | |
| Flow Time (min) | 15.6 | 20.4 | 20.4 | 17.8 | 17.2 | 13 | 16.4 |
| Flow Time Increase (%) | 0 | 30.8 | 30.8 | 14.1 | 10.3 | −16.7 | 5.1 |

*"F287" stands for "Formulation 287" which is a formulation without a BO-based polyol.

The reactivity of several sample formulations described in Table V is measured using the HTR TADM method; and the results provide a reactivity comparison between BO-based polyol Sample B and castor oil.

After introducing 12 parts of VORAPEL™ T5001 polyol or 12 parts of BO capped polyol Sample B (the formulations which are described in Table V), the reactivity of the composite formulations has been significantly reduced; the formulations containing 12 parts VORAPEL™ T5001 polyol or 12 parts BO capped polyol Sample B; both provide a formulation with 30% longer flow time (in min). There is still more than 15% longer flow time for the formulations even when the TOPF dosage has been increased from 11 parts to 14 parts. With 12 parts BO-capped polyol Sample B, even a formulation containing as high as a 17% dosage level of TOPF provides a formulation with 5% longer flow time compared to a benchmark formulation referred to herein as Formulation 287 (also abbreviated as "F287"). The data in the examples indicates that the BO-based polyol is able to significantly reduce the reactivity of PU composite formulations.

The mechanical performance of using a BO-based polyol in a composite formulation compared to using castor oil in a composite formulation is described with reference to Table VI. The castor oil in the composite formulations described in Table VI is partially replaced with a BO-based polyol. For example, as shown in Table VI, in Inv. Ex. 4, 25 wt % castor oil is replaced with BO-based polyol Sample A; and in Inv. Ex. 5 the 25 wt % castor oil is replaced with BO-based polyol Sample B. Then, the mechanical performance (tensile strength) of the formulations is measured. The results described in Table VII show the effect of a BO-based polyol on the mechanical performance of a PU composite formulation, that is, the results show that the mechanical performance (tensile strength) of the formulations increased by 4% and 8%, respectively.

Inventive Examples 4 and 5 and Comparative Example C

TABLE VI

Mechanical Performance of PU Composite Formulations

| | Comp. Ex. C (wt %) | Inv. Ex. 4 (wt %) | Inv. Ex. 5 (wt %) |
|---|---|---|---|
| Component | | | |
| VORANOL CP-260 | 25 | 25 | 25 |
| SIMULSOL TOFP | 11 | 11 | 11 |
| Sample A | | 25 | |
| Sample B | | | 25 |
| Castor oil | 49 | 24 | 24 |
| Di propylene glycol (DPG) | 4 | 4 | 4 |
| Zeolite | 7 | 7 | 7 |
| Triethyl phosphate (TEP) | 4 | 4 | 4 |
| BYK A-530 (Defoamer) | 0.2 | 0.2 | 0.2 |
| Total | 100.2 | 100.2 | 100.2 |
| Measurements | | | |
| Index | 1.1 | 1.1 | 1.1 |
| Iso quantity | 103 | 101 | 101 |

TABLE VII

| Property | Comp. Ex. C | Inv. Ex. 4 | Inv. Ex. 5 |
|---|---|---|---|
| Mean of Tensile Stress at Yield (MPa) | 63 | 65 | 68 |
| Increasement (%) | 0.00 | 4.00 | 8 |

Table VIII describes the effect of a BO-based polyol on the mechanical performance of full PU composite formulations. After introducing 12 parts of a BO-based polyol in the formulation and increasing the SIMULSOL TOFP dosage from 11 parts to 17 parts in the formulation, the mechanical performance (tensile strength) increases by 13% for the formulation with BO capped polyol Sample B) and by 18% for pure BO-based polyol VORAPEL T5001, as shown by the data in Table VIII.

TABLE VIII

| Run No. | Full Formulation | F287* | VORAPEL T5001 T17 | Cas_C_T17 |
|---|---|---|---|---|
| 1 | VORANOL CP260 | 24.91 | 25 | 25 |
| 2 | Castor oil | 48.41 | 31 | 31 |
| 3 | Di propylene glycol (DPG) | 1.5 | 1.5 | 1.5 |
| 4 | VORAPEL T5001 | 0 | 12 | 0 |
| 5 | Sample B | 0 | 0 | 12 |
| 6 | Zoelith Powder | 9.48 | 9.5 | 9.5 |
| 7 | SIMULSOL TOFP | 10.96 | 17 | 17 |
| 8 | BYK-A 530 | 0.2 | 0.2 | 0.2 |
| 9 | Techpur Black | 0.15 | 0.15 | 0.15 |
| 10 | Phosphoric acid | 0.03 | 0.03 | 0.03 |
| 11 | Triethyl phosphate | 3.98 | 4 | 4 |
| 12 | BYK W980 | 0.4 | 0.4 | 0.4 |
|   | SPECFLEX NS540 | 102 | 117.32 | 113.23 |

*"F287" stands for "Formulation 287" which is a formulation without a BO-based polyol.

TABLE IX

| Formulation | Tensile Strength (MPa) | Tensile Increase (%) |
|---|---|---|
| Benchmark (F287*) | 64.34 | 0 |
| C-T17 | 72.95 | 13.38 |
| VORAPEL T5001-T17 | 76.07 | 18.23 |

*"F287" stands for "Formulation 287" which is a formulation without a BO-based polyol.

The compatibility between castor oil and petrol-based polyols can be described with reference to FIGS. 4 and 5 and Tables X and XI.

TABLE X

Design of Experiment For Polyol Blend (VORANOL CP260, SIMULSOL TOFP and Castor Oil)

| Run No. | VORANOL CP260 | SIMULSOL TOFP | Castor Oil | Phase Separation* |
|---|---|---|---|---|
| 1 | 0.14 | 0.10 | 0.76 | 0 |
| 2 | 0.26 | 0.29 | 0.44 | 1 |
| 3 | 0.66 | 0.33 | 0.01 | 0 |
| 4 | 0.00 | 0.02 | 0.98 | 0 |
| 5 | 0.31 | 0.04 | 0.65 | 0 |
| 6 | 0.01 | 0.95 | 0.04 | 0 |
| 7 | 0.54 | 0.23 | 0.22 | 1 |
| 8 | 0.73 | 0.18 | 0.09 | 0 |
| 9 | 0.50 | 0.00 | 0.50 | 0 |
| 10 | 0.25 | 0.75 | 0.00 | 0 |
| 11 | 0.45 | 0.16 | 0.39 | 1 |
| 12 | 0.13 | 0.72 | 0.15 | 1 |
| 13 | 0.01 | 0.43 | 0.56 | 1 |
| 14 | 0.22 | 0.57 | 0.21 | 1 |
| 15 | 0.21 | 0.20 | 0.59 | 1 |
| 16 | 0.10 | 0.49 | 0.41 | 1 |
| 17 | 0.32 | 0.41 | 0.27 | 1 |
| 18 | 0.04 | 0.65 | 0.31 | 1 |
| 19 | 0.91 | 0.06 | 0.03 | 0 |
| 20 | 0.06 | 0.26 | 0.68 | 0 |
| 21 | 0.62 | 0.08 | 0.30 | 1 |
| 22 | 0.48 | 0.38 | 0.14 | 1 |
| 23 | 0.81 | 0.01 | 0.18 | 0 |
| 24 | 0.41 | 0.53 | 0.06 | 0 |

*0 = no phase separation; and 1 = phase separation.

TABLE XI

Design of Experiment for Polyol Blend (VORANOL CP260, SIMULSOL TOFP and Castor Oil + VORAPEL T5001)

| Run No. | VORANOL CP260 | SIMULSOL TOEP | Castor Oil | Phase Separation* |
|---|---|---|---|---|
| 1 | 0.14 | 0.10 | 0.76 | 0 |
| 2 | 0.26 | 0.29 | 0.44 | 0 |
| 3 | 0.66 | 0.33 | 0.01 | 0 |
| 4 | 0.00 | 0.02 | 0.98 | 0 |
| 5 | 0.31 | 0.04 | 0.65 | 0 |
| 6 | 0.01 | 0.95 | 0.04 | 0 |
| 7 | 0.54 | 0.23 | 0.22 | 0 |
| 8 | 0.73 | 0.18 | 0.09 | 0 |
| 9 | 0.50 | 0.00 | 0.50 | 0 |
| 10 | 0.25 | 0.75 | 0.00 | 0 |
| 11 | 0.45 | 0.16 | 0.39 | 0 |
| 12 | 0.13 | 0.72 | 0.15 | 1 |
| 13 | 0.01 | 0.43 | 0.56 | 1 |
| 14 | 0.22 | 0.57 | 0.21 | 1 |
| 15 | 0.21 | 0.20 | 0.59 | 0 |
| 16 | 0.10 | 0.49 | 0.41 | 0 |
| 17 | 0.32 | 0.41 | 0.27 | 1 |
| 18 | 0.04 | 0.65 | 0.31 | 1 |
| 19 | 0.91 | 0.06 | 0.03 | 0 |
| 20 | 0.06 | 0.26 | 0.68 | 0 |
| 21 | 0.62 | 0.08 | 0.30 | 0 |
| 22 | 0.48 | 0.38 | 0.14 | 1 |
| 23 | 0.81 | 0.01 | 0.18 | 0 |
| 24 | 0.41 | 0.53 | 0.06 | 0 |

*0 = no phase separation; and 1 = phase separation.

In FIG. 4, there is shown a phase diagram of a ternary blend including the following three components: VORANOL CP260, SIMULSOL TOFP and castor oil. In FIG. 5, there is shown a phase diagram of a ternary blend including the following components: (i) VORANOL CP260, SIMULSOL TOFP and castor oil; (ii) VORAPEL T5001 (at a ratio of 62:24). In the phase diagrams of FIGS. 4 and 5, hollow diamond defines a compatible sample and the filled rectangle defines an incompatible sample.

From the phase diagram results in FIGS. 4 and 5, it can be clearly seen that after adding BO-based polyol VORAPEL T5001, the compatibility between castor oil and petrol-based polyols (VORANOL CP260 and SIMULSOL TOFP) has been significantly increased; and the incompatible zone has been dramatically reduced (e.g., 50% smaller than a sample without VORAPEL T5001).

TABLE XII

Effect of BO-based Polyol (VORAPEL T5001 or Sample B) on Compatibility for Polyol Blend

| Component | Run No. 1 | 2 | 3 | 4 | 5 | 6 |
|---|---|---|---|---|---|---|
| VORANOL CP260 | 25 | 25 | 25 | 25 | 25 | 25 |
| SIMULSOL TOFP | 14 | 14 | 14 | 17 | 17 | 17 |
| VORAPEL T5001 | 0 | 12 | 0 | 0 | 12 | 0 |
| Sample B | 0 | 0 | 12 | 0 | 0 | 12 |
| Castor oil | 46 | 34 | 34 | 43 | 31 | 31 |

Figure 6:
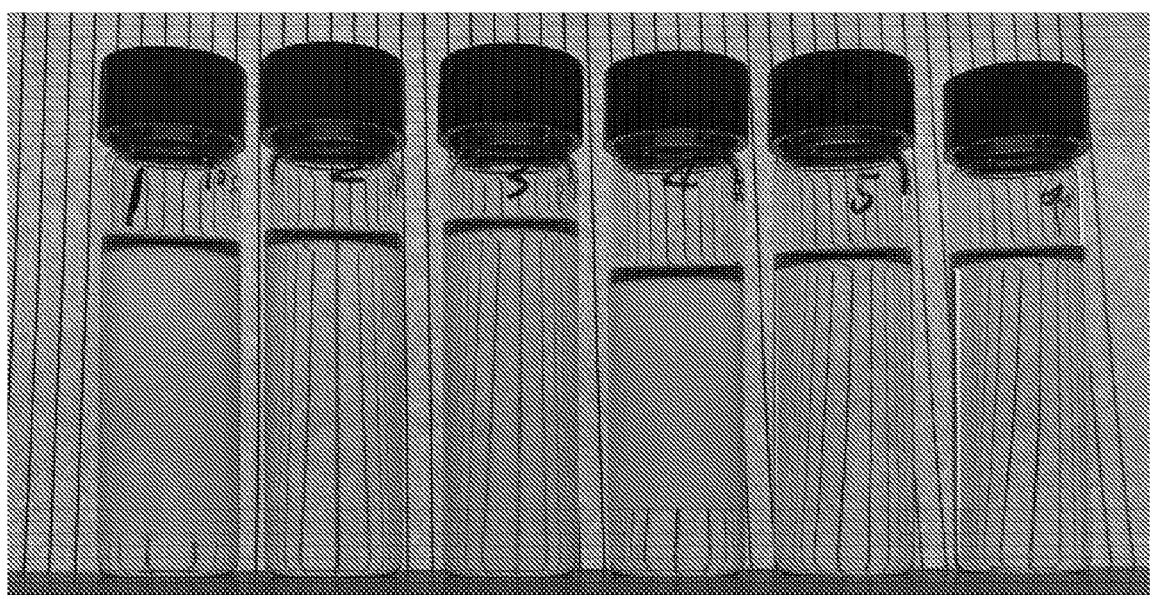
FIG. 6 is photograph of a series of bottles containing samples of compositions, wherein some of bottles contain a BO-based polyol (e.g., VORAPEL T5001 or Sample B) and some of the compositions without a BO-based polyol; and wherein the bottles containing the BO-based polyol show a visibly clear composition which can be attributed to the effect of the BO-based polyol on the compatibility property of the composition.

In FIG. 6, there is shown a photograph of six sample polyurethane composite formulations (herein referred to as "Samples 1-6") contained in six capped cylindrical sample tube bottles. FIG. 6 illustrates the effect of a BO-based polyol (e.g., VORAPEL T5001 or Sample B) on the compatibility of a PU composite formulation. The results in FIG. 6, shows that before adding a BO-based polyol to a formulation, Sample 1 containing 14% TOPF and Sample 4 containing 17% SIMULSOL TOFP are turbid. After adding a BO-based polyol to the formulations, Samples 2 and 5 containing VORAPEL T5001; and Samples 3 and 6 containing Sample B; the Samples become clear and single phase, which indicates that the BO-based polyols, both pure BO derivatives (VORAPEL T5001) and EO/BO derivatives (Sample B), significantly increase the compatibility between castor oil and the petrol-based polyols.

From the results of the testing carried out on the sample formulations of the present invention and the comparative examples as described above, it is found that a BO-based polyol (i.e., a polyol capped with BO) shows advantages when compared to a conventional PO-based polyol. For example, the BO-capped polyol of the present invention advantageously has a lower reactivity and a lower moisture absorption performance than a conventional PO-based polyol. Also, formulations containing BO-based polyols of the present invention advantageously have a lower reactivity and an increase in mechanical performance than castor oil.

What is claimed is:

1. A polyurethane composite composition comprising,
a first component comprising a reaction mixture of:
   (a) at least one polyisocyanate compound; and
   (b) a polyol composition comprising at least one butylene oxide-based hydrophobic polyol having a functionality of at least 3 or more present at a percent by weight (wt %) of the polyol composition ranging from 10 wt % to 30 wt %;
   wherein the at least one polyisocyanate compound is present in an amount to provide an isocyanate index of the first component ranging from 80 to 115; and
a second component comprising a fiber material;
wherein the second component is present at a percent by weight (wt %) of the first component and the second component ranging from 40 wt % to 80 wt %.

2. The polyurethane composite composition of claim 1, wherein the polyurethane composite composition has a reduced reactivity property in the range of from 5 percent to 50 percent as measured by a viscosity building-up method.

3. The polyurethane composite composition of claim 1, wherein the polyurethane composite composition has a reduced water absorption property in the range of from 0.4 percent to 1.5 percent after 30 minutes of exposure to a moisture level of 53 percent at 22° C. as measured by the weight increase based water absorption method.

4. The polyurethane composite composition of claim 1, wherein the at least one polyisocyanate is present in the composition at a concentration in the range of from 40 weight percent to 70 weight percent; and wherein the at least one butylene oxide-based hydrophobic polyol is present in the composition at a concentration in the range of from 2 weight percent to 40 weight percent.

5. The polyurethane composite composition of claim 1, wherein the polyurethane composite composition further includes one or more of: (c) at least one ethylene oxide-based polyol, at least one propylene oxide-based polyol, or a mixture thereof; (d) at least one vegetable oil-based polyol; (e) at least one crosslinker; and (f) at least one surfactant.

6. The polyurethane composite composition of claim 1, wherein the at least one butylene oxide-based hydrophobic polyol is selected from the group consisting of a glycerin-containing polyol, a pentaerythritol-containing polyol, a sorbitol-containing polyol, and mixtures thereof.

7. The polyurethane composite composition of claim 1, wherein the polyol composition further comprises a vegetable oil-based polyol.

8. A process for producing a polyurethane composite article made from the above polyurethane composite article composition may include the steps of:
   (I) providing a polyurethane composition comprising a mixture of:
      (a) at least one polyisocyanate compound; and
      (b) a polyol composition comprising at least one butylene oxide-based hydrophobic polyol having a functionality of at least 3 or more present at a percent by weight (wt %) of the polyol composition ranging from 10 wt % to 30 wt %;
      wherein the at least one polyisocyanate compound is present in an amount to provide an isocyanate index of the first component ranging from 80 to 115; and
   (II) contacting the polyurethane composition of step (I) with a structural material such that the structural material is coated with the polyurethane composition; and
   (III) heating the structural material coated with the polyurethane composite article composition of step (II).

* * * * *